(12) United States Patent
Luo et al.

(10) Patent No.: US 10,102,034 B2
(45) Date of Patent: Oct. 16, 2018

(54) METHOD FOR CLEARING APPLICATION PROCESS, AND MOBILE TERMINAL

(71) Applicant: CONEW NETWORK TECHNOLOGY (BEIJING) CO., LTD., Beijing (CN)

(72) Inventors: Peng Luo, Beijing (CN); Zongliang Lin, Beijing (CN); Kangzong Zhang, Beijing (CN); Shengmo Xu, Beijing (CN); Sheng Fu, Beijing (CN)

(73) Assignee: CONEW NETWORK TECHNOLOGY CO. LTD., Beijing (CN)

( * ) Notice: Subject to any disclaimer, the term of this patent is extended or adjusted under 35 U.S.C. 154(b) by 108 days.

(21) Appl. No.: 15/112,133

(22) PCT Filed: Aug. 13, 2014

(86) PCT No.: PCT/CN2014/084325
§ 371 (c)(1),
(2) Date: Jul. 15, 2016

(87) PCT Pub. No.: WO2015/120702
PCT Pub. Date: Aug. 20, 2015

(65) Prior Publication Data
US 2016/0378556 A1    Dec. 29, 2016

(30) Foreign Application Priority Data

Feb. 14, 2014    (CN) .......................... 2014 1 0050910

(51) Int. Cl.
*G06F 3/00*     (2006.01)
*G06F 9/44*     (2018.01)
(Continued)

(52) U.S. Cl.
CPC ............. *G06F 9/5016* (2013.01); *G06F 9/485* (2013.01); *G06F 9/544* (2013.01); *Y02D 10/24* (2018.01)

(58) Field of Classification Search
None
See application file for complete search history.

(56) References Cited

U.S. PATENT DOCUMENTS 6,453,430 B1 *    9/2002  Singh .................. G06F 11/0715
                                                      712/227
2005/0021917 A1 *  1/2005  Mathur ............... G06F 9/44594
                                                      711/159
(Continued)

FOREIGN PATENT DOCUMENTS

CN        102196097 A       9/2011
CN        103024190 A       4/2013
(Continued)

OTHER PUBLICATIONS

Chinese Application No. 201410050910.0 English translation of first office action dated Aug. 15, 2017, 14 pages.
(Continued)

*Primary Examiner* — Chat C Do
*Assistant Examiner* — William C Wood
(74) *Attorney, Agent, or Firm* — Lathrop Gage LLP

(57) ABSTRACT

A method and device for clearing an application process, and a mobile terminal are provided. The method for clearing an application process includes: clearing the application process; obtaining a restart interval of the application process; and clearing the application process continuously according to the restart interval, until the restart interval is greater than a predetermined time.

6 Claims, 5 Drawing Sheets

(51) Int. Cl.
*G06F 9/46* (2006.01)
*G06F 13/00* (2006.01)
*G06F 9/50* (2006.01)
*G06F 9/48* (2006.01)
*G06F 9/54* (2006.01)

(56) References Cited

U.S. PATENT DOCUMENTS

2006/0206901 A1* 9/2006 Chan .................. G06F 9/524
                                                        718/107
2014/0223134 A1* 8/2014 Chen .................. G06F 12/0223
                                                        711/171

FOREIGN PATENT DOCUMENTS

| CN | 103092651 A | 5/2013 |
| CN | 103092700 A | 5/2013 |
| CN | 103164229 A | 6/2013 |
| CN | 103324575 A | 9/2013 |
| CN | 103530235 A | 1/2014 |

OTHER PUBLICATIONS

Chinese Application No. 201410050910.0 first office action dated Aug. 15, 2017, 12 pages.
Translation of the International Search Report and Written Opinion corresponding to International Patent Application PCT/CN2014/084325, dated Nov. 26, 2014, 13 pages.

* cited by examiner

METHOD FOR CLEARING APPLICATION PROCESS, AND MOBILE TERMINAL

CROSS-REFERENCE TO RELATED APPLICATION

The present application is a national phase entry under 35 USC § 371 of International Application PCT/CN2014/084325, filed Aug. 13, 2014, which claims the benefit of and priority to Chinese Patent Application No. 201410050910.0, filed Feb. 14, 2014, the entire disclosures of which are incorporated herein by reference.

TECHNICAL FIELD

The present disclosure generally relates to a computer technical field, and more particularly, to a method for clearing an application process, a device for clearing an application process and a mobile terminal.

BACKGROUND

With the rapid development of the mobile terminal technology, the mobile terminals (e.g., mobile phones) become popular and provide more and more functions. For example, a user can install various applications freely and it is popular that dozens of applications are installed in a mobile terminal.

Different kinds of applications provide different services. For example, news applications may provide news on that very day. "Lazy Weather" application may provide the weather conditions in the last few days of the city about which we are concerned.

However, the mobile terminal becomes slow after the user installs many applications in the mobile terminal. When the mobile terminal becomes slow, the user may kill the background processes to release the memory by calling the application programming interfaces of the operating system of the mobile terminal using some memory clearing processes, or may use the restart package to release the memory.

However, in a process of implementing the invention, the inventors have found that there are following problems in the related art. With the upgrade of the operating system of the mobile terminal, the process cannot be cleared or just can be killed temporarily using the existing clearing solutions. Moreover, the killed process can be restarted automatically. Therefore, the existing clearing solutions cannot clear the application process actually, such that the memory cannot be cleared effectively, thus affecting the running speed of the mobile phone and increasing the power consumption.

SUMMARY

The present disclosure is aimed to solve at least one of the above problems.

Accordingly, a first objective of the present disclosure is to provide a method for clearing an application process, which may clear the process effectively.

A second objective of the present disclosure is to provide a device for clearing an application process.

A third objective of the present disclosure is to provide a mobile terminal.

A fourth objective of the present disclosure is to provide a method for clearing an application process.

A fifth objective of the present disclosure is to provide a device for clearing an application process.

A sixth objective of the present disclosure is to provide a mobile terminal.

A seventh objective of the present disclosure is to provide a program.

An eighth objective of the present disclosure is to provide a storage medium.

A ninth objective of the present disclosure is to provide another program.

A tenth objective of the present disclosure is to provide another storage medium.

In order to achieve the above objectives, the method for clearing an application process according to embodiments of a first aspect of the present disclosure includes:
 clearing the application process;
 obtaining a restart interval of the application process; and
 clearing the application process continuously according to the restart interval, until the restart interval is greater than a predetermined time.

With the method for clearing an application process according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the device for clearing an application process according to embodiments of a second aspect of the present disclosure includes a clearing module, a first obtaining module and a processing module.

With the device for clearing an application process according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the mobile terminal according to embodiments of a third aspect of the present disclosure includes: a shell, a processor, a memory, a circuit board and a power supply circuit, in which
 the circuit board is located in a space formed by the shell, the processor and the memory are arranged on the circuit board; the power supply circuit is configured to supply power for each circuit or component in the mobile terminal; the memory is configured to store executable program codes; the processor executes a program corresponding to the executable program codes by reading the executable program codes stored in the memory so as to:
 clear the application process;
 obtain a restart interval of the application process; and
 clear the application process continuously according to the restart interval, until the restart interval is greater than a predetermined time.

With the mobile terminal according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the method for clearing an application process according to embodiments of a fourth aspect of the present disclosure includes:

monitoring the application process;

clearing the application process if it is monitored that the application process is restarted automatically, until a times of clearing the application process reaches a predetermined times, such that a restart interval of the application process being cleared the predetermined times is greater than a predetermined time.

With the method for clearing an application process according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the device for clearing an application process according to embodiments of a fifth aspect of the present disclosure includes a monitoring module and a clearing module.

With the device for clearing an application process according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the mobile terminal according to embodiments of a sixth aspect of the present disclosure includes: a shell, a processor, a memory, a circuit board and a power supply circuit, in which the circuit board is located in a space formed by the shell, the processor and the memory are arranged on the circuit board; the power supply circuit is configured to supply power for each circuit or component in the mobile terminal; the memory is configured to store executable program codes; the processor executes a program corresponding to the executable program codes by reading the executable program codes stored in the memory so as to:

monitor the application process; and clear the application process if it is monitored that the application process is restarted automatically, until a times of clearing the application process reaches a predetermined times, such that a restart interval of the application process being cleared the predetermined times is greater than a predetermined time.

With the mobile terminal according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the application program according to embodiments of a seventh aspect of the present disclosure is configured to perform the method for clearing an application process according to embodiments of the first aspect of the present disclosure.

With the application program according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the storage medium according to embodiments of an eighth aspect of the present disclosure is configured to store an application program that, when being executed, performs the method for clearing an application process according to embodiments of the first aspect of the present disclosure.

With the storage medium according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the application program according to embodiments of a ninth aspect of the present disclosure is configured to perform the method for clearing an application process according to embodiments of the fourth aspect of the present disclosure.

With the application program according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to achieve the above objectives, the storage medium according to embodiments of a tenth aspect of the present disclosure is configured to store an application program that, when being executed, performs the method for clearing an application process according to embodiments of the fourth aspect of the present disclosure.

With the storage medium according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
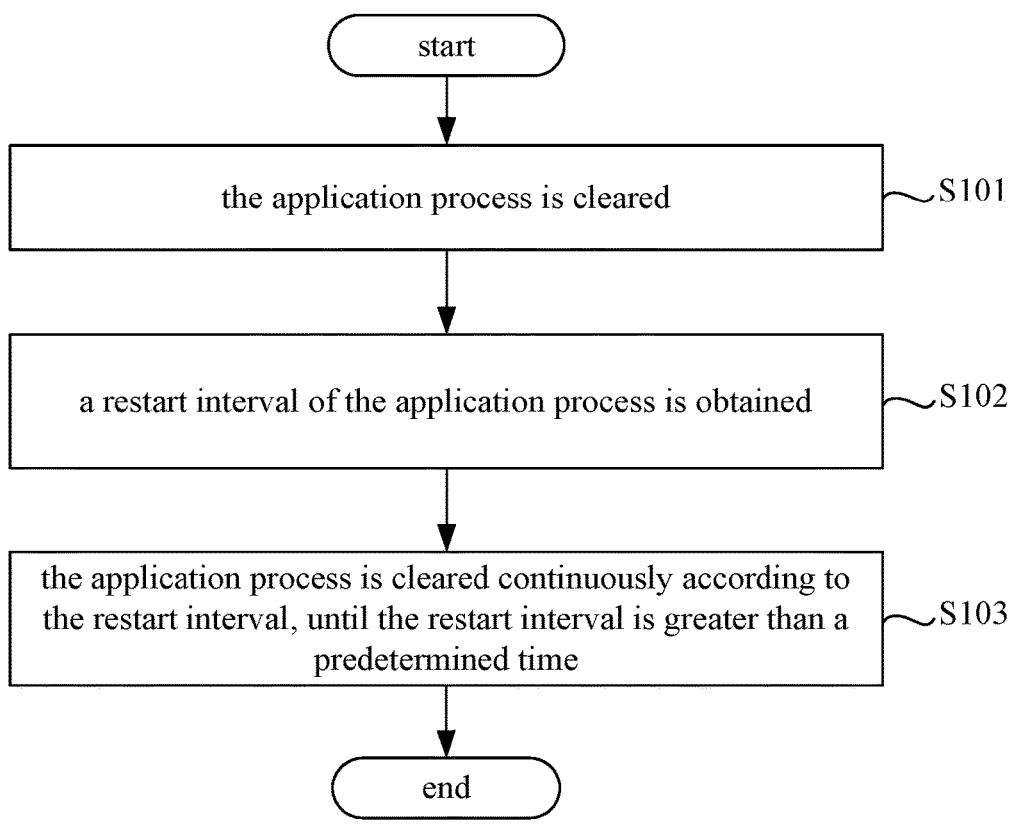
FIG. 1 is a flow chart of a method for clearing an application process according to an embodiment of the present disclosure.

Reference will now be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. Embodiments of the present disclosure may include alternatives, modifications and equivalents within the spirit and scope of the appended claims.

In addition, terms such as "first" and "second" are used herein for purposes of description and are not intended to indicate or imply relative importance or significance or to imply the number of indicated technical features. In the description of the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations. Further, in the description of the present invention, "a plurality of" means two or more than two, unless specified otherwise.

Any process or method described in a flow chart or described herein in other ways may be understood to include one or more modules, segments or portions of codes of executable instructions for achieving specific logical functions or steps in the process. Although the flow chart shows a specific order of execution, it is understood that the order of execution may differ from what is depicted. For example, the order of execution of two or more boxes may be scrambled relative to the order shown.

In the following, a method for clearing an application process, a device for clearing an application process and a mobile terminal according to embodiments of the present disclosure will be described with reference to the drawings.

FIG. 1 is a flow chart of a method for clearing an application process according to an embodiment of the present disclosure. The method for clearing an application process according to embodiments of the present disclosure may be applied in a mobile terminal, and the mobile terminal may be a mobile phone, a panel computer (PAD), a computer and so on. The mobile terminal may adopt the Android system or other systems.

As shown in FIG. 1, the method for clearing an application process may include following steps.

In step S101, the application process is cleared.

In embodiments of the present disclosure, the above application process is usually a process triggered by an application.

Before clearing the application process, the type of the application process is required to be determined, i.e. it is determined whether the application process is an application process which can be restarted automatically after being cleared or an application process which cannot be cleared.

The clearing solution in this embodiment is directed against the application process which can be restarted automatically after being cleared.

After determining the application process as an application process which can be restarted automatically after being cleared, the application process is cleared.

In step S102, a restart interval of the application process is obtained.

Since the application process is an application process which can be restarted automatically after being cleared, the application process can be restarted automatically after being cleared, and then the restart interval of the application process may be obtained.

In step S103, the application process is cleared continuously according to the restart interval, until the restart interval is greater than a predetermined time.

The application process which can be restarted automatically after being cleared has a characteristic that the application process is restarted by the system at intervals after being cleared, and the system constantly extends the restart interval of the application process if the application process is cleared continuously.

For example, after an application process is killed (cleared), the system will restart the application process after 5 s. If the restarted application process is killed again, the system may restart the application process after 15 s. That is, the restart interval of the application process is getting longer as the number of times of clearing the application process increases. Generally, the restart interval is 3-6 times as long as the last restart interval.

Therefore, the application process may be continuously killed according to the extended restart interval after being cleared, until the restart interval is rather long and the effect of restarting the application process may be ignored for the user.

Specifically, the clear interval may be set according to the restart interval, and the application process is cleared according to the clear interval, until the restart interval due to the last clearance is greater than the predetermined time. The clear interval is greater than the restart interval.

In order to show the characteristic that the restart interval of the application process is getting longer as the application process is cleared continuously, Table 1 is taken as an example for explanation.

TABLE 1

Relationship between the value of N and the restart interval

| Value of N | Restart interval between the $N^{th}$ clearance and the $N^{th}$ restart |
|---|---|
| 1 | 5 s |
| 2 | 15 s |
| 3 | 45 s |
| . . . | . . . |
| j − 1 | 40000 |
| j | 200000 |

Table 1 is explanatory. j in Table 1 is an integer greater than 3. 200000 is merely an explanatory value which indicates that the restart interval is rather long, but not a real restart interval.

In this embodiment, the clear interval of the application process may be set according to the characteristic that the restart interval is extended once the application process is cleared.

Specifically, the clear interval between the $M^{th}$ clearance and the $(M-1)^{th}$ clearance may be set according to the restart interval, until the restart interval due to the last clearance is greater than the predetermined time, where $M \geq 2$. The predetermined time may be set flexibly in accordance with requirements and conditions, and it may be as big as possible, such as greater than 200000 s. In other words, the restart interval is rather long after the application process is cleared j times (as shown in Table 1), such that the restart of the application process may be ignored for the user, thus achieving an effect of killing the application process.

In order to indicate the relationship between the clear interval and the restart interval clearly, Table 2 is taken as an example to show the clear interval between the $M^{th}$ clearance and the $(M-1)^{th}$ clearance.

TABLE 2

Relationship between the value of M and the clear interval

| Value of M | Clear interval |
|---|---|
| 2 | 6 s |
| 3 | 16 s |
| . . . | . . . |
| j | 40001 |

It can be seen from Table 2 that the application process may be cleared immediately in 1 s after being restarted.

Since the application process is cleared after being restarted, the clear interval is greater than the restart interval and the difference between the clear interval and the restart interval is not big. A big difference between the clear interval and the restart interval indicates that the application process which is not required by the user remains running in the background for a long while, which affects the running speed of the terminal, such as the mobile phone.

In embodiments of the present disclosure, the difference between the clear interval and the restart interval may be within a certain time range, for example, the difference is greater than or equal to 1 s, and smaller than or equal to 3 s. In Table 3, the difference is 2 s.

TABLE 3

Relationship between the value of M and the clear interval

| The application process is cleared for the $M^{th}$ times | Clear interval |
|---|---|
| $2^{nd}$ | 7 s |
| $3^{rd}$ | 17 s |
| . . . | . . . |
| $j^{th}$ | 40002 |

The above clearing method is especially suitable to clear the application process without root authority, because application processes without root authority in the terminal with the Android system are always restarted. The root authority is the highest authority, i.e. having all permissions in the system, for example, starting or closing a process, deleting or adding a user, adding or forbidding hardware. However, the application process usually does not have the root authority, so the method for clearing the application process according to embodiments of the present disclosure has a strong applicability.

Figure 2:
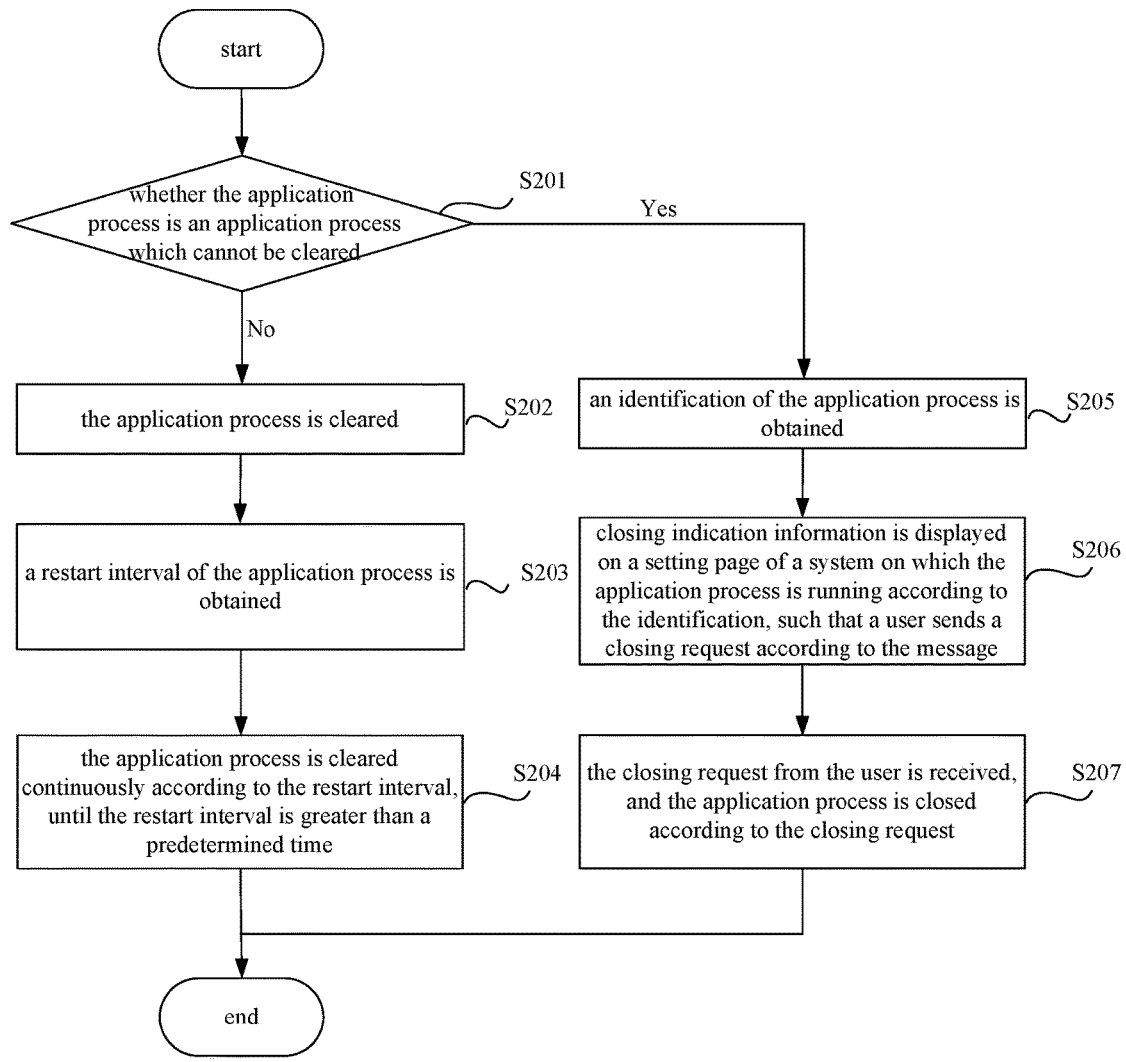
FIG. 2 is a flow chart of a method for clearing an application process according to another embodiment of the present disclosure.

The Embodiment shown in FIG. 1 provides the clearing solution directed against the application process which can be restarted automatically after being cleared. Moreover, the solutions according to embodiments of the present disclosure may be also suitable for the application process which cannot be cleared. As shown in FIG. 2, the clearing process includes following steps.

In step S201, it is judged whether the application process is an application process which cannot be cleared, if not, steps S202-204 are executed, or else, step S205 is followed.

A clearing solution directed against the application process which cannot be cleared is added in FIG. 2 based on FIG. 1. Steps S202-204 completely correspond to steps S101-103 respectively, which are not elaborated herein.

In step S205, the application process is determined as an application process which cannot be cleared, and an identification of the application process is obtained.

There are various application processes which cannot be cleared, such as an application process dwelling in the background. Generally, the application process dwelling in the background may be generated in following situations.

First, the application process dwelling in the background is generated due to the characteristic of the Android system. Many application processes exiting from the interface are kept in the background by the Android system to await a next running, such that the corresponding applications may run more quickly next time. However, if a process is not required to be restarted, the memory can be released by clearing the process, such that the running speed of the system may be improved.

Second, some harmful or unreasonable applications are running in the background in the case that the user does not want them. These applications occupy the memory and affect the speed of the mobile phone, or even bring a hidden danger of leaking information.

Figure 3:
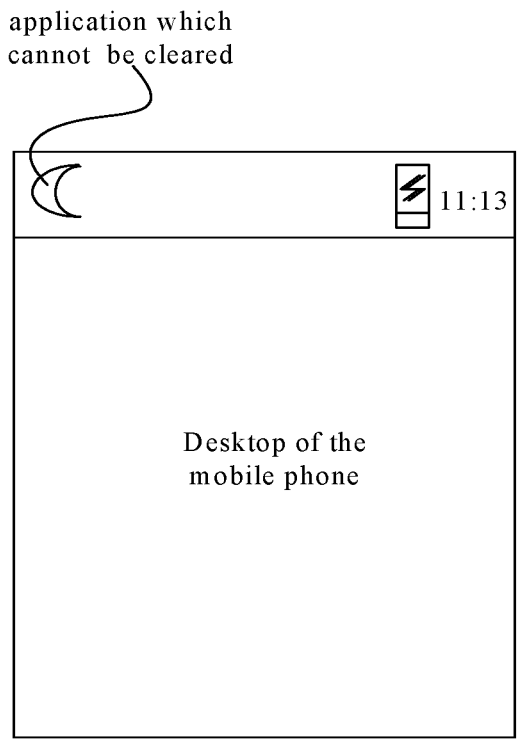
FIG. 3 is a schematic diagram of an application process which cannot be cleared according to an embodiment of the present disclosure.

For example, the "Lazy weather" application is opened to view the weather information. However, after exiting the "Lazy weather" application, it can be seen from the notification bar of the mobile phone that it still dwells in the background. As shown in FIG. 3, the application process is an application process which cannot be cleared.

In step S206, closing indication information is displayed on a setting page of a system on which the application process is running according to the identification, such that a user sends a closing request according to the closing indication information.

In this embodiment, the closing indication information may be displayed by creating a tip dialog.

In step S207, the closing request from the user is received, and the application process is closed according to the closing request.

Specifically, the closing indication information may be displayed on the setting page of the system of the terminal to guide the user to click the force stopping button, thus solving the problem that the application process cannot be cleared.

Similarly, the method shown in FIG. 2 is also very suitable to clear the application process without root authority. Of course, the clearing method shown in FIG. 1 or FIG. 2 may be used to clear the application process with root authority.

With the above clearing method, by guiding the user to perform a force stopping operation on the process manually using the indication information, the problem that the process cannot be cleared may be solved fundamentally, such that the situation that the process is started automatically at a boot time is avoided, and the running speed of the terminal is improved.

With the method for clearing an application process according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

Figure 4:
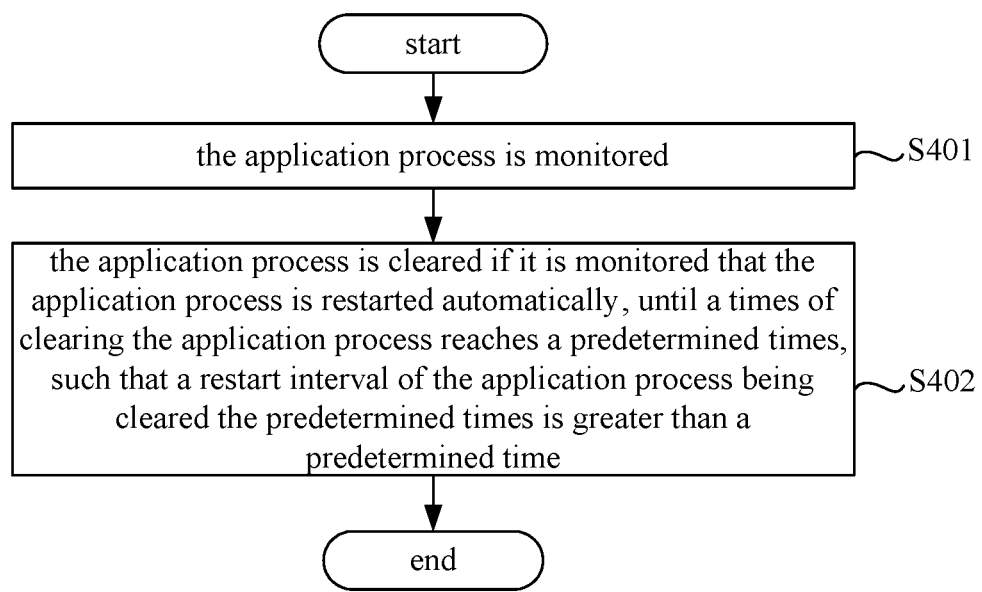
FIG. 4 is a flow chart of a method for clearing an application process according to yet another embodiment of the present disclosure.

FIG. 4 is a flow chart of a method for clearing an application process according to another embodiment of the present disclosure. The method for clearing an application process according to embodiments of the present disclosure may be applied in a mobile terminal. The mobile terminal may be a mobile phone, a panel computer (PAD), a computer and so on. The mobile terminal may adopt the Android system or other systems.

As shown in FIG. 4, the method for clearing an application process may include following steps.

In step S401, the application process is monitored.

In embodiments of the present disclosure, the above application process is usually a process triggered by an application.

Before monitoring the application process, the type of the application process is required to be determined, i.e. it is determined whether the application process is an application process which can be restarted automatically after being cleared or an application process which cannot be cleared. The clearing solution in this embodiment is directed against the application process which can be restarted automatically after being cleared.

The application process which can be restarted automatically after being cleared has a characteristic that the application process is restarted by the system at intervals after being cleared, and the system constantly extends the restart interval of the application process if the application process is cleared continuously. In other words, the restart interval of the application process is rather long if the application process is cleared a certain number of times (such as 100 times), and basically the effect of restarting the application process may be ignored for the user.

In step S402, the application process is cleared if it is monitored that the application process is restarted automatically, until a times of clearing the application process reaches a predetermined times, such that a restart interval of the application process being cleared the predetermined times is greater than a predetermined time.

Since the application process is an application process which can be restarted automatically after being cleared, the application process can be restarted automatically after being cleared, and then the application process is required to be cleared, i.e. once it is monitored that the application process is restarted automatically, the application process is cleared, until the times of clearing the application process reaches the predetermined times. The predetermined times may be obtained according to historical data. For example, for most application processes, after being cleared 100 times, the restart interval is rather long. The predetermined times may be set to 100 times. Certainly, the predetermined times may be set to 120 times or 140 times. In this way, the restart interval of the application process is ensured to be rather long after all the application processes are cleared, but the clearing efficiency is reduced because some application processes are cleared too many times. Therefore, the predetermined times may be set by considering demands on all aspects.

The above clearing method is especially suitable to clear the application process without root authority, because application processes without root authority in the terminal with Android system are always restarted. The root authority is the highest authority, i.e. having all permissions in the system, for example, starting or closing a process, deleting or adding a user, adding or forbidding hardware. However, the application process usually does not have the root authority, so the method for clearing the application process according to embodiments of the present disclosure has a strong applicability.

Figure 5:
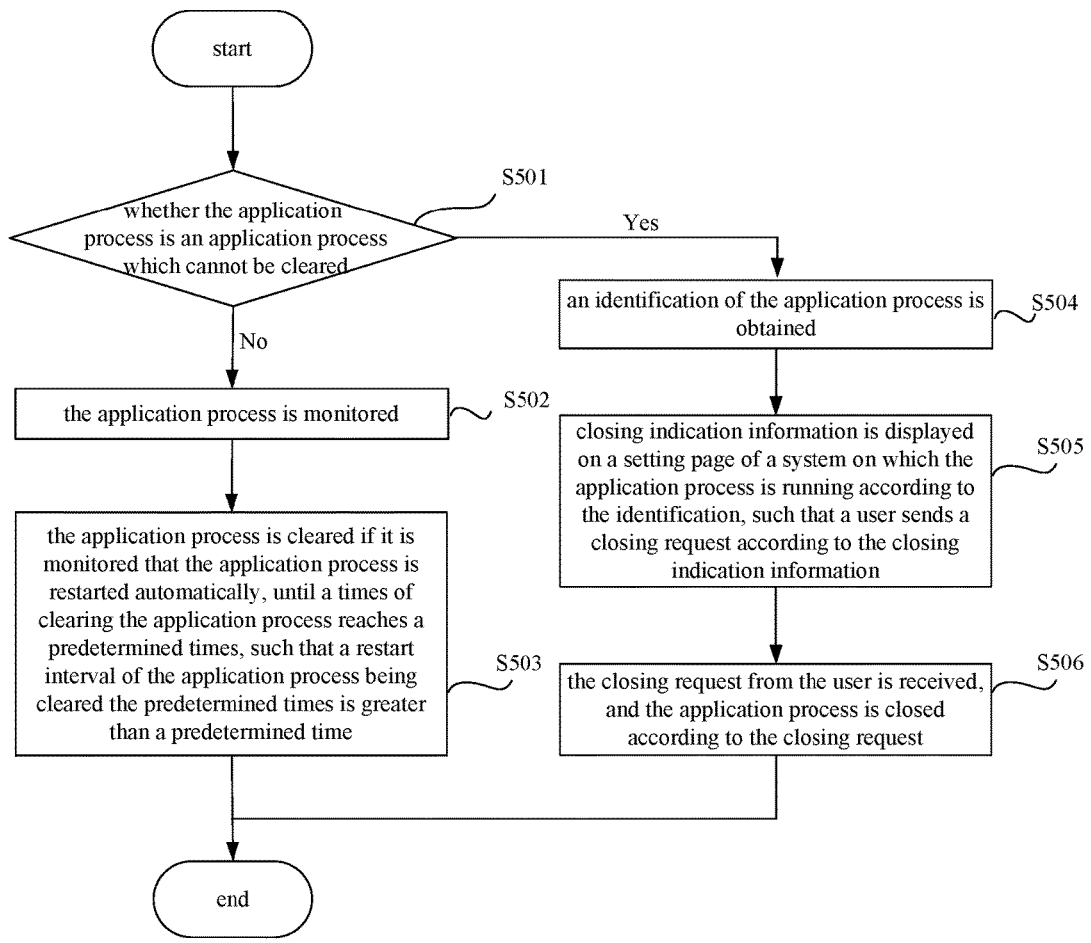
FIG. 5 is a flow chart of a method for clearing an application process according to yet another embodiment of the present disclosure.

The Embodiment shown in FIG. 4 provides the clearing solution directed against the application process which can be restarted automatically after being cleared. Moreover, the solutions according to embodiments of the present disclosure may be also suitable for the application process which cannot be cleared. As shown in FIG. 5, the clearing process includes following steps.

In step S501, it is judged whether the application process is an application process which cannot be cleared, if not, steps S502-503 are executed, or else, step S504 is followed.

A clearing solution directed against the application process which cannot be cleared is added in FIG. 5 based on FIG. 4. Steps S502-503 completely correspond to steps S401-402 respectively, which are not elaborated herein.

In step S504, the application process is determined as an application process which cannot be cleared, and an identification of the application process is obtained.

There are various application processes which cannot be cleared, such as an application process dwelling in the background. Generally, the application process dwelling in the background may be generated in following situations.

First, the application process dwelling in the background is generated due to the characteristic of the Android system. Many application processes exiting from the interface are kept in the background by the Android system to await a next running, such that the corresponding applications may run more quickly next time. However, if a process is not required to be restarted, the memory can be released by clearing the process, such that the running speed of the system may be improved.

Second, some harmful or unreasonable applications are running in the background in the case that the user does not want them. These applications occupy the memory and affect the speed of the mobile phone, or even bring a hidden danger of leaking information.

For example, the "Lazy weather" application is opened to view the weather information. However, after exiting the "Lazy weather" application, it can be seen from the notification bar of the mobile phone that it still dwells in the background. As shown in FIG. 3, the application process is an application process which cannot be cleared.

In step S505, closing indication information is displayed on a setting page of a system on which the application process is running according to the identification, such that a user sends a closing request according to the closing indication information.

In this embodiment, the closing indication information may be displayed by creating a tip dialog.

In step S506, the closing request from the user is received, and the application process is closed according to the closing request.

Specifically, the closing indication information may be displayed on the setting page of the system of the terminal to guide the user to click the force stopping button, thus solving the problem that the application process cannot be cleared.

Similarly, the method shown in FIG. 5 is also very suitable to clear the application process without root authority. Of course, the clearing method shown in FIG. 4 or FIG. 5 may be used to clear the application process with root authority.

With the above clearing method, by guiding the user to perform a force stopping operation on the process manually using the indication information, the problem that the process cannot be cleared may be solved fundamentally, such that the situation that the process is started automatically at a boot time is avoided, and the running speed of the terminal is improved.

With the method for clearing an application process according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, embodiments of the present disclosure further provide a device for clearing an application process. The device for clearing an application process may be applied in a mobile terminal. The mobile terminal may be a mobile phone, a panel computer (PAD), a computer and so on. The mobile terminal may adopt the Android system or other systems.

Figure 6A:
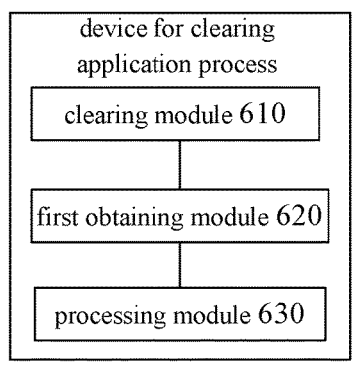
FIG. 6a is a block diagram of a device for clearing an application process according to an embodiment of the present disclosure.

FIG. 6a is a block diagram of a device for clearing an application process according to an embodiment of the present disclosure.

As shown in FIG. 6a, the device for clearing an application process includes a clearing module 610, a first obtaining module 620, and a processing module 630.

The clearing module 610 is configured to clear the application process. The first obtaining module 620 is configured to obtain a restart interval of the application process. The processing module 630 is configured to clear the application process continuously according to the restart interval, until the restart interval is greater than a predetermined time.

The above application process is usually a process triggered by an application. The application processes include two kinds: an application process which cannot be cleared and an application process which can be restarted automatically after being cleared. The application process which can be restarted automatically after being cleared has a characteristic that the application process is restarted by the system at intervals after being cleared, and the system constantly extends the restart interval of the application process if the application process is cleared continuously. For example, after an application process is killed (cleared), the system will restart the application process after 5 s. If the application process is killed again after being restarted, the system may restart the application process after 15 s. That is, the restart interval of the application process is getting longer as the number of times of clearing the application process increases. Generally, the restart interval is 3-6 times as long as the last restart interval.

Therefore, the application process may be continuously killed according to the extended restart interval after being cleared, until the restart interval is rather long and the effect of restarting the application process may be ignored for the user.

Specifically, the processing module 630 may set the clear interval according to the restart interval, and the application process is cleared according to the clear interval, until the restart interval corresponding to the last clearance is greater than the predetermined time. The clear interval is greater than the restart interval. Concerning the specific examples of the clear interval and the restart interval, reference is made to Tables 1-3, which are not elaborated herein.

Additionally, the clearing module 610, the first obtaining module 620 and the processing module 630 work co-operatively to effectively clear the application process which can be restarted automatically after being cleared. Concerning the clearing process, reference is made to FIG. 1, which is not elaborated herein.

In order to effectively clear the application process which cannot be cleared, the device may further include a judging module 640, a second obtaining module 650, a displaying module 660 and a closing module 670.

Figure 6B:
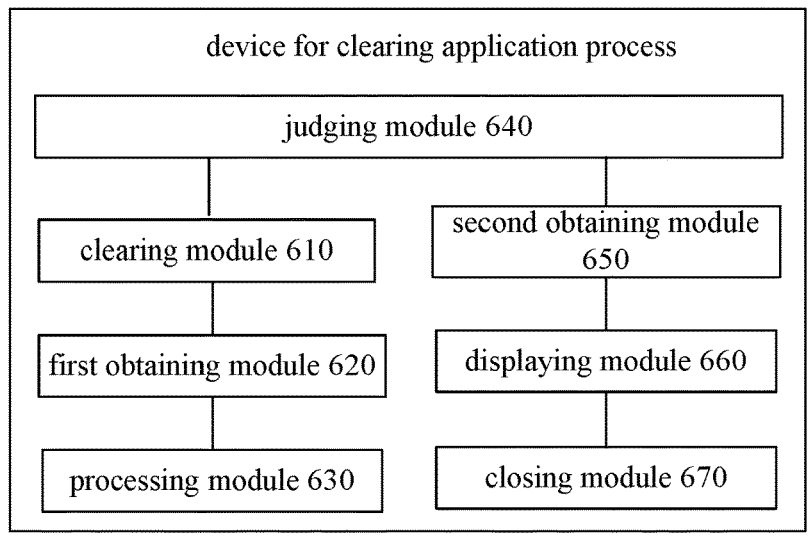
FIG. 6b is a block diagram of a device for clearing an application process according to another embodiment of the present disclosure.

As shown in FIG. 6b, the judging module 640 is configured to judge whether the application process is an application process which cannot be cleared and to determine that the application process is not an application process which cannot be cleared before the clearing module 610 clears the application process. The second obtaining module 650 is configured to obtain an identification of the application process after the judging module 640 judges whether the application process is an application process which cannot be cleared and determines that the application process is not an application process which cannot be cleared. The displaying module 660 is configured to display closing indication information on a setting page of a system on which the application process is running according to the identification, such that a user sends a closing request according to the closing indication information. The closing module 670 is configured to receive the closing request and to close the application process according to the closing request. There are various application processes which cannot be cleared, such as an application process dwelling in the background. Concerning the description of the application process dwelling in the background, reference is made to the corresponding part of the embodiment shown in FIG. 2, which is not elaborated herein.

The displaying module 660 may display the closing indication information by creating a tip dialog. Specifically, the closing indication information may be displayed on the system setting page of the terminal to guide the user to click the force stopping button, thus solving the problem that the application process cannot be cleared.

Additionally, the second obtaining module 650, the displaying module 660 and the closing module 670 work co-operatively to effectively clear the application process which can be restarted automatically after being cleared. Concerning the clearing process, reference is made to FIG. 2, which is not elaborated herein.

The clearing devices shown in FIG. 6a and FIG. 6b are suitable to clear the application process without root authority. Of course, the clearing device may be used to clear the application process with root authority. Concerning the description of the root authority, reference is made to the corresponding part of the embodiment shown in FIG. 2, which is not elaborated herein.

With the device for clearing an application process according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, embodiments of the present disclosure further provide a device for clearing an application process. The device for clearing an application process may be applied in a mobile terminal. The mobile terminal may be a mobile phone, a panel computer (PAD), a computer and so on. The mobile terminal may adopt the Android system or other systems.

Figure 7A:
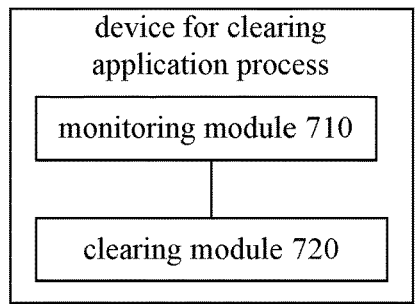
FIG. 7a is a block diagram of a device for clearing an application process according to yet another embodiment of the present disclosure.

FIG. 7a is a block diagram of a device for clearing an application process according to another embodiment of the present disclosure.

As shown in FIG. 7a, the device for clearing an application process includes a monitoring module 710 and a clearing module 720.

The monitoring module 710 is configured to monitor the application process. The clearing module 720 is configured to clear the application process if it is monitored that the application process is restarted automatically, until a times of clearing the application process reaches a predetermined times, such that a restart interval of the application process being cleared the predetermined times is greater than a predetermined time.

The above application process is usually a process triggered by an application. The application processes include two kinds: an application process which cannot be cleared and an application process which can be restarted automatically after being cleared. The application process which can be restarted automatically after being cleared has a characteristic that the application process is restarted by the system at intervals after being cleared, and the system constantly extends the restart interval of the application process if the application process is cleared continuously. For example, after an application process is killed (cleared), the system will restart the application process after 5 s. If the application process is killed again after being restarted, the system may restart the application process after 15 s. That is, the restart interval of the application process is getting longer as the number of times of clearing the application process increases. Generally, the restart interval is 3-6 times as long as the last restart interval.

Therefore, the application process may be cleared many times, such that the restart interval corresponding to the last clearance is rather long and the effect of restarting the application process may be ignored for the user.

Specifically, the predetermined times may be obtained according to historical data. For example, for most application processes, after being cleared 100 times, the restart interval is rather long. The predetermined times may be set to 100 times. Certainly, the predetermined times may be set to 120 times or 140 times. In this way, the restart interval of the application process is ensured to be rather long after all the application processes are cleared, but the clearing efficiency is reduced because some application processes are cleared too many times. Therefore, the predetermined times is set by considering demands on all aspects.

Additionally, the monitoring module 710 and the clearing module 720 work co-operatively to effectively clear the application process which can be restarted automatically after being cleared. Concerning the clearing process, reference is made to FIG. 4, which is not elaborated herein.

In order to effectively clear the application process which cannot be cleared, the device may further include a judging module 730, an obtaining module 740, a displaying module 750 and a closing module 760.

Figure 7B:
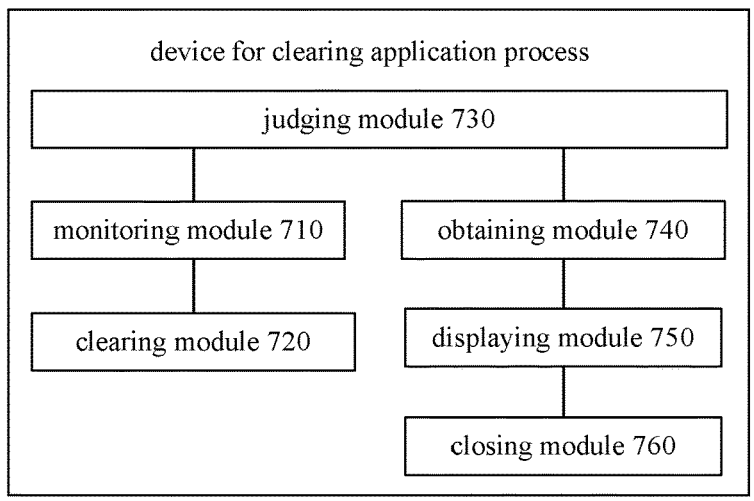
FIG. 7b is a block diagram of a device for clearing an application process according to yet another embodiment of the present disclosure.

As shown in FIG. 7b, the judging module 730 is configured to judge whether the application process is an application process which cannot be cleared and to determine that the application process is not an application process which cannot be cleared before the monitoring module monitors the application process. The obtaining module 740 is configured to obtain an identification of the application process after the judging module 730 judges whether the application process is an application process which cannot be cleared and determines that the application process is not an application process which cannot be cleared. The displaying module 750 is configured to display closing indication information on a setting page of a system on which the application process is running according to the identification, such that a user sends a closing request according to the closing indication information. The closing module 760 is configured to receive the closing request and to close the application process according to the closing request. There are various application processes which cannot be cleared, such as an application process dwelling in the background. Concerning the description of the application process dwelling in the background, reference is made to the corresponding part of the embodiment shown in FIG. 2, which is not elaborated herein.

The displaying module 750 may display the closing indication information by creating a tip dialog. Specifically, the closing indication information may be displayed on the system setting page of the terminal to guide the user to click the force stopping button, thus solving the problem that the application process cannot be cleared.

Additionally, the obtaining module 740, the displaying module 750 and the closing module 760 work co-operatively to effectively clear the application process which can be restarted automatically after being cleared. Concerning the clearing process, reference is made to FIG. 5, which is not elaborated herein.

The clearing devices shown in FIG. 7a and FIG. 7b are suitable to clear the application process without root authority. Of course, the clearing device may be used to clear the application process with root authority. Concerning the description of the root authority, reference is made to the corresponding part of the embodiment shown in FIG. 2, which is not elaborated herein.

With the device for clearing an application process according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, the present disclosure further provides a mobile terminal. The mobile terminal includes a shell, a processor, a memory, a circuit board and a power supply circuit. The circuit board is located in a space formed by the shell. The processor and the memory are arranged on the circuit board. The power supply circuit is configured to supply power for each circuit or component in the mobile terminal. The memory is configured to store executable program codes. The processor executes a program corresponding to the executable program codes by reading the executable program codes stored in the memory so as to execute following steps.

In step S101', the application process is cleared.

In embodiments of the present disclosure, the above application process is usually a process triggered by an application. The mobile terminal may be a mobile phone, a panel computer (PAD), and so on.

Before the mobile terminal clears the application process, the type of the application process is required to be determined, i.e. it is determined whether the application process is an application process which can be restarted automatically after being cleared or an application process which cannot be cleared. The clearing solution in this embodiment is directed against the application process which can be restarted automatically after being cleared.

After determining the application process as an application process which can be restarted automatically after being cleared, the application process is cleared.

In step S102', a restart interval of the application process is obtained.

Since the application process is an application process which can be restarted automatically after being cleared, the application process can be restarted automatically after being cleared, and then the restart interval of the application process may be obtained.

In step S103', the application process is cleared continuously according to the restart interval, until the restart interval is greater than a predetermined time.

The application process which can be restarted automatically after being cleared has a characteristic that the application process is restarted by the system at intervals after being cleared, and the system constantly extends the restart interval of the application process if the application process is cleared continuously.

For example, after an application process is killed (cleared), the system will restart the application process after 5 s. If the application process is killed again after being restarted, the system may restart the application process after 15 s. That is, the restart interval of the application process is getting longer as the number of times of clearing the application process increases. Generally, the restart interval is 3-6 times as long as the last restart interval.

Therefore, the mobile terminal may continuously kill the application process according to the extended restart interval after application process is cleared, until the restart interval is rather long and the effect of restarting the application process may be ignored for the user.

Specifically, the clear interval may be set according to the restart interval, and the application process is cleared according to the clear interval, until the restart interval due to the last clearance is greater than the predetermined time. The clear interval is greater than the restart interval.

In order to show the characteristic that the restart interval of the application process is getting longer as the application process is cleared continuously, Table 1 is taken as an example for explanation.

TABLE 1

Relationship between the value of N and the restart interval

| Value of N | Restart interval between the $N^{th}$ clearance and the $N^{th}$ restart |
|---|---|
| 1 | 5 s |
| 2 | 15 s |
| 3 | 45 s |
| ... | ... |
| j − 1 | 40000 |
| j | 200000 |

Table 1 is explanatory. j in Table 1 is an integer greater than 3. 200000 is merely an explanatory value which indicates that the restart interval is rather long, but not a real restart interval.

In this embodiment, the mobile terminal may set the clear interval of the application process according to the characteristic that the restart interval is extended once the application process is cleared.

Specifically, the mobile terminal may set the clear interval between the $M^{th}$ clearance and the $(M-1)^{th}$ clearance according to the restart interval, until the restart interval due to the last clearance is greater than the predetermined time, where $M \geq 2$. The predetermined time may be set flexibly in accordance with requirements and conditions, and it may be as big as possible, such as greater than 200000 s. In other words, the restart interval is rather long after the application process is cleared j times (as shown in Table 1), such that the restart of the application process may be ignored for the user, thus achieving an effect of killing the application process.

In order to indicate the relationship between the clear interval and the restart interval clearly, Table 2 is taken as an example to show the clear interval between the $M^{th}$ clearance and the $(M-1)^{th}$ clearance.

TABLE 2

Relationship between the value of M and the clear interval

| Value of M | Clear interval |
|---|---|
| 2 | 6 s |
| 3 | 16 s |
| ... | ... |
| j | 40001 |

It can be seen from Table 2 that the application process may be cleared immediately in 1 s after being restarted.

Since the application process is cleared after being restarted, the clear interval is greater than the restart interval and the difference between the clear interval and the restart interval is not big. A big difference between the clear interval and the restart interval indicates that the application process which is not required by the user remains running in the background for a long while, which affects the running speed of the terminal, such as the mobile phone.

In embodiments of the present disclosure, the difference between the clear interval and the restart interval may be within a certain time range, for example, the difference is greater than or equal to 1 s, and smaller than or equal to 3 s. In Table 3, the difference is 2 s.

TABLE 3

Relationship between the value of M and the clear interval

| The application process is cleared for the $M^{th}$ times | Clear interval |
|---|---|
| $2^{nd}$ | 7 s |
| $3^{rd}$ | 17 s |
| ... | ... |
| $j^{th}$ | 40002 |

The above mobile terminal is especially suitable to clear the application process without root authority, because application processes without root authority in the terminal with the Android system are always restarted. The root authority is the highest authority, i.e. having all permissions in the system, for example, starting or closing a process, deleting or adding a user, adding or forbidding hardware. However, the application process usually does not have the root authority, so the method for clearing the application process according to embodiments of the present disclosure has a strong applicability.

The Embodiment shown in FIG. 1 provides the clearing solution directed against the application process which can be restarted automatically after being cleared. Moreover, the mobile terminal according to embodiments of the present disclosure may be also suitable for the application process which cannot be cleared. As shown in FIG. 2, the clearing process executed by the mobile terminal includes following steps.

In step S201', it is judged whether the application process is an application process which cannot be cleared, if not, steps S202-204 are executed, or else, step S205 is followed.

A clearing solution directed against the application process which cannot be cleared is added in FIG. 2 based on FIG. 1. Steps S202'-204' completely correspond to steps S101'-103', which are not elaborated herein.

In step S205', the application process is determined as an application process which cannot be cleared, and an identification of the application process is obtained.

There are various application processes which cannot be cleared, such as an application process dwelling in the background. Generally, the application process dwelling in the background may be generated in following situations.

First, the application process dwelling in the background is generated due to the characteristic of the Android system. Many application processes exiting from the interface are kept in the background by the Android system to await a next running, such that the corresponding applications may run more quickly next time. However, if a process is not required to be restarted, the memory can be released by clearing the process, such that the running speed of the system may be improved.

Second, some harmful or unreasonable applications are running in the background in the case that the user does not want them. These applications occupy the memory and affect the speed of the mobile phone, or even bring a hidden danger of leaking information.

For example, the "Lazy weather" application is opened to view the weather information. However, after exiting the "Lazy weather" application, it can be seen from the notification bar of the mobile phone that it still dwells in the background. As shown in FIG. 3, the application process is an application process which cannot be cleared.

In step S206', closing indication information is displayed on a setting page of a system on which the application process is running according to the identification, such that a user sends a closing request according to the closing indication information.

In this embodiment, the mobile terminal may display the closing indication information by creating a tip dialog.

In step S207', the closing request from the user is received, and the application process is closed according to the closing request.

Specifically, the mobile terminal may display the closing indication information on the setting page of the system of the terminal to guide the user to click the force stopping button, thus solving the problem that the application process cannot be cleared.

Similarly, the clearing method shown in FIG. 2 is also very suitable to clear the application process without root authority. Of course, the clearing method shown in FIG. 1 or FIG. 2 may be used to clear the application process with root authority.

With the above mobile terminal, by guiding the user to perform a force stopping operation on the process manually using the indication information, the problem that the process cannot be cleared may be solved fundamentally, such that the situation that the process is started automatically at a boot time is avoided, and the running speed of the terminal is improved.

With the mobile terminal according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, the present disclosure further provides a mobile terminal. The mobile terminal includes a shell, a processor, a memory, a circuit board and a power supply circuit. The circuit board is located in a space formed by the shell. The processor and the memory are arranged on the circuit board. The power supply circuit is configured to supply power for each circuit or component in the mobile terminal. The memory is configured to store executable program codes. The processor executes a program corresponding to the executable program codes by reading the executable program codes stored in the memory so as to execute following steps.

In step S401', the application process is monitored.

In embodiments of the present disclosure, the above application process is usually a process triggered by an application. The mobile terminal may be a mobile phone, a panel computer (PAD), and so on.

Before the mobile terminal monitors the application process, the type of the application process is required to be determined, i.e. it is determined whether the application process is an application process which can be restarted automatically after being cleared or an application process which cannot be cleared. The clearing solution in this embodiment is directed against the application process which can be restarted automatically after being cleared.

The application process which can be restarted automatically after being cleared has a characteristic that the application process is restarted by the system at intervals after being cleared, and the system constantly extends the restart interval of the application process if the application process is cleared continuously. In other words, the restart interval of the application process is rather long if the application process is cleared a certain number of times (such as 100 times), and basically the effect of restarting the application process may be ignored for the user.

In step S402', the application process is cleared if it is monitored that the application process is restarted automatically, until a times of clearing the application process reaches a predetermined times, such that a restart interval of the application process being cleared the predetermined times is greater than a predetermined time.

Since the application process is an application process which can be restarted automatically after being cleared, the application process can be restarted automatically after being cleared by the mobile terminal, and then the application process is required to be cleared, i.e. once the mobile terminal monitors that the application process is restarted automatically, the application process is cleared, until the times of clearing the application process reaches the predetermined times. The predetermined times may be obtained according to historical data. For example, for most application processes, after being cleared 100 times, the restart interval is rather long. The predetermined times may be set to 100 times. Certainly, the predetermined times may be set to 120 times or 140 times. In this way, the restart interval of the application process is ensured to be rather long after all the application processes are cleared, but the clearing efficiency is reduced because some application processes are cleared too many times. Therefore, the predetermined times may be set by considering demands on all aspects.

The above mobile terminal is especially suitable to clear the application process without root authority, because application processes without root authority in the terminal with Android system are always restarted. The root authority is the highest authority, i.e. having all permissions in the system, for example, starting or closing a process, deleting or adding a user, adding or forbidding hardware. However, the application process usually does not have the root authority, so the method for clearing the application process according to embodiments of the present disclosure has a strong applicability.

The Embodiment shown in FIG. 4 provides the clearing solution directed against the application process which can be restarted automatically after being cleared. Moreover, the mobile terminal according to embodiments of the present disclosure may be also suitable for the application process which cannot be cleared. As shown in FIG. 5, the clearing process includes following steps.

In step S501', it is judged whether the application process is an application process which cannot be cleared, if not, steps S502'-503' are executed, or else, step S504' is followed.

A clearing solution directed against the application process which cannot be cleared is added in FIG. 5 based on FIG. 4. Steps S502'-503' completely correspond to steps S401'-402', which are not elaborated herein.

In step S504', the application process is determined as an application process which cannot be cleared, and an identification of the application process is obtained.

There are various application processes which cannot be cleared, such as an application process dwelling in the background. Generally, the application process dwelling in the background may be generated in following situations.

First, the application process dwelling in the background is generated due to the characteristic of the Android system.

Many application processes exiting from the interface are kept in the background by the Android system to await a next running, such that the corresponding applications may run more quickly next time. However, if a process is not required to be restarted, the memory can be released by clearing the process, such that the running speed of the system may be improved.

Second, some harmful or unreasonable applications are running in the background in the case that the user does not want them. These applications occupy the memory and affect the speed of the mobile phone, or even bring a hidden danger of leaking information.

For example, the "Lazy weather" application is opened to view the weather information. However, after exiting the "Lazy weather" application, it can be seen from the notification bar of the mobile phone that it still dwells in the background. As shown in FIG. 3, the application process is an application process which cannot be cleared.

In step S505', closing indication information is displayed on a setting page of a system on which the application process is running according to the identification, such that a user sends a closing request according to the closing indication information.

In this embodiment, the mobile terminal may display the closing indication information by creating a tip dialog.

In step S506', the closing request from the user is received, and the application process is closed according to the closing request.

Specifically, the mobile terminal may display the closing indication information on the setting page of the system of the terminal to guide the user to click the force stopping button, thus solving the problem that the application process cannot be cleared.

Similarly, the method shown in FIG. 5 is also very suitable to clear the application process without root authority. Of course, the clearing method shown in FIG. 4 or FIG. 5 may be used to clear the application process with root authority.

With the above mobile terminal, by guiding the user to perform a force stopping operation on the process manually using the indication information, the problem that the process cannot be cleared may be solved fundamentally, such that the situation that the process is started automatically at a boot time is avoided, and the running speed of the terminal is improved.

With the mobile terminal according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, the present disclosure further provides an application program. The application program is configured to perform the method for clearing an application process according to embodiments shown in FIG. 1 or FIG. 2 when being executed.

With the application program according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, the present disclosure further provides a storage medium, configured to store an application program that, when being executed, performs the method for clearing an application process according to embodiments shown in FIG. 1 or FIG. 2.

With the storage medium according to embodiments of the present disclosure, by utilizing the characteristic that the restart interval of an application process is getting longer as the number of times of clearing the application process increases, the application process is cleared continuously, until the restart interval due to the last clearance is rather long, such that the effect of restarting the application process may be ignored for the user and the clearing efficiency is improved. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, the present disclosure further provides another application program. The application program is configured to perform the method for clearing an application process according to embodiments shown in FIG. 4 or FIG. 5 when being executed.

With the application program according to embodiments of the present disclosure, by utilizing the characteristic that the restart interval of an application process is getting longer as the number of times of clearing the application process increases, the application process is cleared many times, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

In order to implement the above embodiments, the present disclosure further provides another storage medium, configured to store an application program that, when being executed, performs the method for clearing an application process according to embodiments shown in FIG. 4 or FIG. 5.

With the storage medium according to embodiments of the present disclosure, by utilizing the characteristic that the restart interval of an application process is getting longer as the number of times of clearing the application process increases, the application process is cleared continuously, such that the restart interval due to the last clearance is rather long and the effect of restarting the application process may be ignored for the user. Additionally, by guiding the user to click a force stopping button utilizing the indication information, the problem that the process cannot be cleared may be solved, such that the memory can be cleared effectively, the running speed of the terminal may be improved and the power may be saved.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for clearing an application process, comprising:
   clearing the application process;
   obtaining a restart interval of the application process;
   setting a clear interval according to the restart interval; and,
   clearing the application process continuously according to the restart interval, until the restart interval corresponding to a last clearance is greater than the predetermined time, the clear interval being greater than the restart interval;
   wherein the application process comprises an application process which can be restarted automatically after being cleared.

2. The method according to claim 1, before clearing the application process, further comprising:
   judging whether the application process is an application process which cannot be cleared, and determining that the application process is not an application process which cannot be cleared.

3. The method according to claim 2, after judging whether the application process is an application process which cannot be cleared, further comprising:
   obtaining an identification of the application process if it is determined that the application process is an application process which cannot be cleared;
   displaying closing indication information on a setting page of a system on which the application process is running according to the identification, such that a user sends a closing request according to the closing indication information;
   receiving the closing request;
   closing the application process according to the closing request.

4. A mobile terminal, comprising a shell, a processor, a memory, a circuit board and a power supply circuit, wherein
   the circuit board is located in a space formed by the shell, the processor and the memory are arranged on the circuit board;
   the power supply circuit is configured to supply power for each circuit or component in the mobile terminal;
   the memory is configured to store executable program codes;
   the processor executes a program corresponding to the executable program codes by reading the executable program codes stored in the memory so as to:
   clear the application process;
   obtain a restart interval of the application process;
   set a clear interval according to the restart interval; and,
   clear the application process continuously according to the restart interval, until the restart interval corresponding to a last clearance is greater than the predetermined time, the clear interval being greater than the restart interval;
   wherein the application process comprises an application process which can be restarted automatically after being cleared.

5. The mobile terminal according to claim 4, wherein the processor is further configured to:
   judge whether the application process is an application process which cannot be cleared, and to determine that the application process is not an application process which cannot be cleared.

6. The mobile terminal according to claim 5, wherein the processor is further configured to:
   obtain an identification of the application process if it is determined that the application process is an application process which cannot be cleared;
   display closing indication information on a setting page of a system on which the application process is running according to the identification, such that a user sends a closing request according to the closing indication information;
   receive the closing request; and
   close the application process according to the closing request.

* * * * *